United States Patent [19]

Finn

[11] Patent Number: 4,784,399
[45] Date of Patent: Nov. 15, 1988

[54] MODULAR TUBE TRAILER

[76] Inventor: John F. Finn, 147 Beach Hill Rd., Berlin, Mass. 01503

[21] Appl. No.: 29,449

[22] Filed: Mar. 23, 1987

[51] Int. Cl.$^4$ ............................ B60P 3/22; B61D 5/02
[52] U.S. Cl. ....................................... 280/5 C; 410/42; 410/48
[58] Field of Search ........................ 410/31, 32, 34, 35, 410/36, 42, 46, 47, 48, 77, 78, 81, 68, 71, 49; 105/360, 358; 280/5 C, 5 R; 211/71, 194

[56] References Cited

U.S. PATENT DOCUMENTS 2,761,397  9/1956  Holst ................................. 105/360
3,479,043  11/1969  Piehl ................................. 105/360

Primary Examiner—Robert B. Reeves
Assistant Examiner—Joseph D. Pape
Attorney, Agent, or Firm—Blodgett & Blodgett

[57] ABSTRACT

A tube trailer for cylindrical compressed gas tubes which are arranged in rigid modular units, each with a plurality of tubes. The tubes in each package are mounted between a pair of brackets so that they are parallel spaced and lie in a single plane. At least one end of each tube has a projection which is adapted to be connected to a valve fixture of manifolding and piping which is located at one end of the trailer bed. The modular tube package is removably mounted on the trailer bed and a plurality of tube packages are removably coupled together.

9 Claims, 3 Drawing Sheets

MODULAR TUBE TRAILER

BACKGROUND OF THE INVENTION

The present invention is directed generally to a tube trailer for transporting elongated cylindrical tubes of compressed gas. Conventional tube trailers consist of a semi-trailer which is adapted to be drawn by a detactable tractor unit. The framework of the trailer includes a horizontal supporting bed. The tubes of compressed gas are stacked on the bed of the trailer and are secured by straps or the like. The tubes are further supported at their ends by front and rear plates which extend upwardly from the bed. Each end of the tube has a threaded tip which extends through an aperture in the plate and which enables the tip to be bolted to the plate. The rear end of the trailer is provided with manifolding and piping for supplying compressed gases to and for withdrawing the gases from the tubes. The nipples of the tubes at one end are operatively connected to the manifolding.

Due to the many regulations which govern the use of compressed gas tubes, the tubes must be tested periodically for leakage and structural defects. The entire stack of tubes on the trailer must be disassembled for testing each individual tube. This involves a great deal of time and expense. The testing includes hydrostatic or acoustic emissions, mechanical, ultrasonic and leakage.

Another problem which is encountered with prior art tube trailers is that there is a tendency for rusting to occur at points where the tubes are in contact with each other. This particular problem is solved by supporting the tubes solely at their ends so that a slight space is maintained between the tubes. Such a supporting system is shown in U.S. Pat. No. 2,761,397, to Holst issued. However, the entire tube supporting structure must be disassembled for testing of individual tubes. These and other difficulties experienced with the prior art tube trailers have been obviated by the present invention.

It is, therefore, a principle object of the invention to provide a tube trailer in which the tubes are arranged in modular units which can be manipulated independently of each other and stacked as a single unit on the trailer, thereby greatly facilitating removable of the tubes from the trailer and remounting of the tubes on the trailer.

Another object of the invention is the provision of a tube trailer in which tubes are mounted on the trailer with sufficient spacing between the tubes to permit some types of testing without removing the tubes from the trailer.

A further object of the present invention is the provision of a tube trailer having modular tube packages for varying easily the tube capacity of the trailer in accordance with particular needs and to facilitate periodic replacement of the tubes.

It is another object of the present invention to provide a tube trailer consisting of modular tube packages which can be assembled and disassembled easily and which can be coupled easily on the bed of the trailer as a single unit.

With these and other objects in view, as will be apparent to those skilled in the art, the invention resides in the combination of parts set forth in the specification and covered by the claims appended hereto.

SUMMARY OF THE INVENTION

In general, the invention consists of a tube trailer having a horizontal supporting bed, manifolding and piping at one end of the bed for supplying compressed gases to and for drawing compressed gases from various gas containers. The trailer includes one or more modular tube packages, each consisting of a plurality of cylindrical compressed gas tubes having complimentary fixtures for connecting to the fixtures of the manifolding, and means for fixing the modular tube package to the bed of the trailer. More specifically, the modular tube package comprises a first bracket, a second bracket, and connecting means for fixing the first bracket to one end of each of the tubes and the second bracket to the opposite end of the tubes so that the tubes are parallel and spaced within a single plane. Also, means are provided for coupling a plurality of modular tube packages together as a single unit on a trailer bed.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
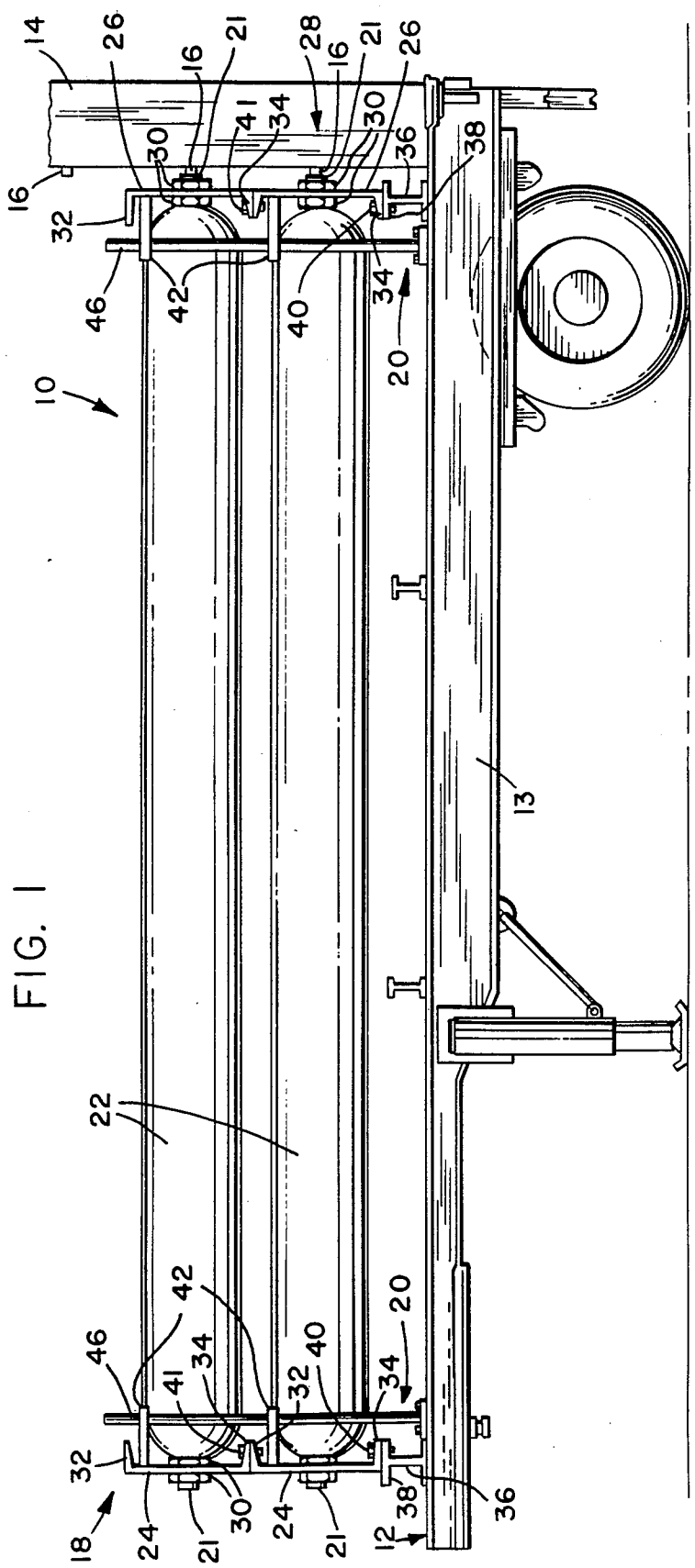
FIG. 1 is a side elevational view of a tube trailer embodying the principles of the present invention.
Figure 2:
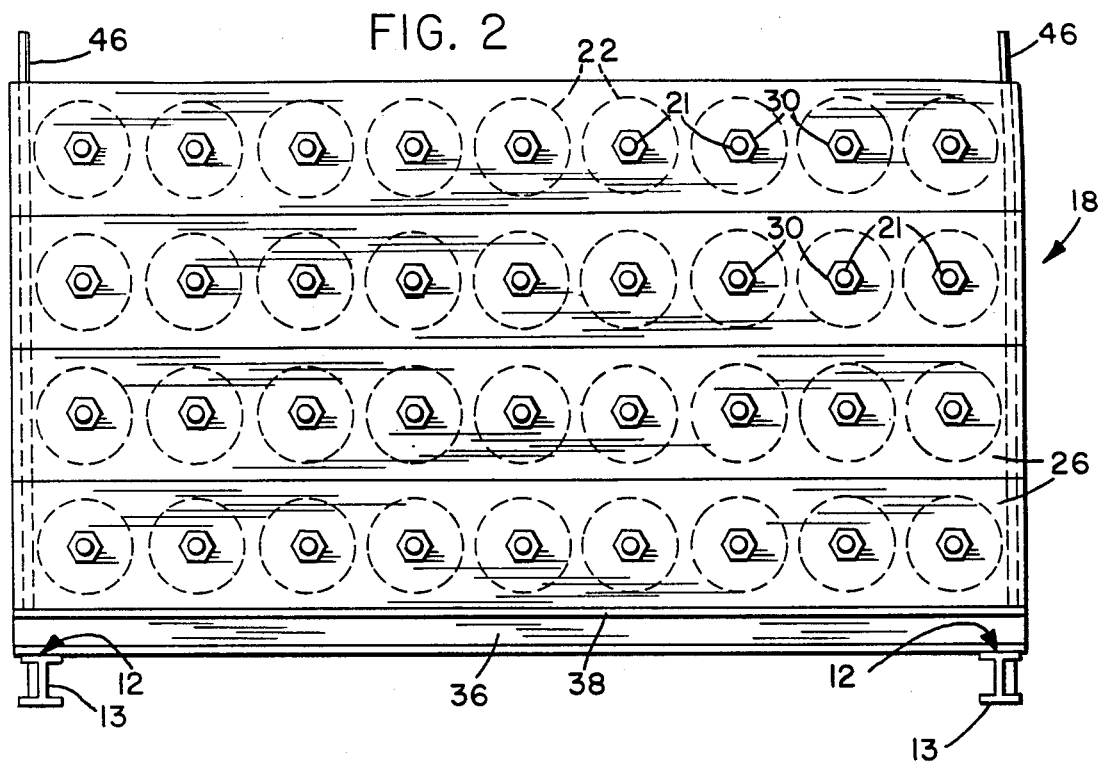
FIG. 2 is a front elevational view of the tube trailer.

Referring first to FIGS. 1 and 2, which best show the general features of the invention, the tube trailer, indicated generally by the reference numeral 10, is shown as being of the semi-trailer type which is adapted to be drawn by a detachable tractor unit. The trailer includes a horizontal bed 12 which consists of the top flanges of a pair of I-beams 13 which extend longitudinally of the trailer. A manifold housing 14 is supported at the rear 10 end of the trailer and extends vertically from the bed 12. The housing 14 contains manifolding and piping for supplying compressed gases to and for withdrawing compressed gases from standard gas containers. The manifolding and piping includes a plurality of valve fixtures 16.

Figure 4:
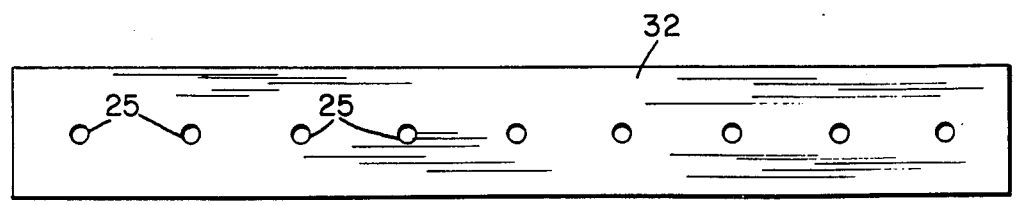
FIG. 4 is a front elevational view of one of the brackets which forms one element of the modular tube package.

The tube trailer 10 also includes one or more rigid modular tube packages 18 which are fixed to the bed 12 by mounting means generally indicated by the reference numeral 20. Each modular tube package 18 comprises a plurality of cylindrical gas tubes 22 which are supported between a first bracket 24 and a second bracket 26. Referring also to FIG. 4, each of the brackets 24 and 26 is provided with a plurality of circular openings 25 which are arranged in a single line along the length of the bracket. Each end of each tube 22 is provided with a projection 21 which extends through the openings 25. Each projection 21 is provided with external threads for receiving a pair of nuts 30 which constitute connecting means, generally indicated by the reference numeral 28, for fastening the tubes to the brackets so that the tubes are parallel and extend in a single horizontal plane when mounted on the bed 12 of the trailer. The projections 21 are complimentary to the fixtures 16 for operatively connecting the tubes to the manifolding and piping within the manifold housing 14. When the tubes 22 are attached to the brackets 24 and 26, the brackets and tubes constitute a rigid modular tube package which can be lifted as a unit by proper power equipment onto the bed of the trailer or removed from the bed for testing or replacement of the tubes.

Figure 5:
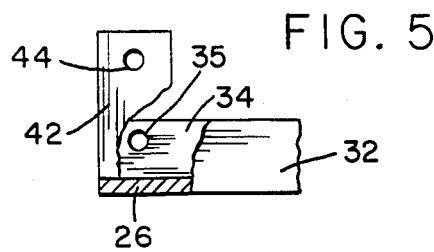
FIG. 5 is a fragmentary plan view of one end of the bracket of FIG. 4, with portions broken away.
Figure 3:
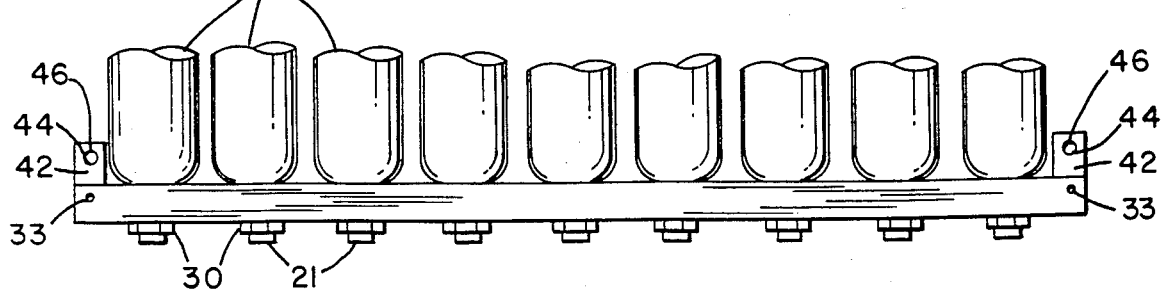
FIG. 3 is a fragmentary plan view of the front end of the trailer.

Each of the brackets 24 and 26 has an upper horizontal flange 32 and a lower horizontal flange 34. Referring also to FIGS. 3 and 5, the upper horizontal flange 32 has n aperture 33 and the lower horizontal flange 34 has an aperture 35. The apertures 33 and 35 are vertically aligned. The first or lowermost modular tube package 18 is mounted on the bed 12 by the mounting means 20. The mounting means 20 comprises an I-beam 36 at each end of the bed 12. Each I-beam 36 includes a pair of upper horizontal base flanges 38. One of the upper flanges of each I-beam is provided with an aperture, not shown, adjacent each side of the trailer. The apertures in the upper flanges 38 of I-beams 36 are vertically aligned with the apertures 35 in the lower horizontal flanges 34 when the brackets 24 and 26 are placed on top of the I-beams 36 as shown in FIG. 1. The mounting means 20 also includes bolts 40 for securing the lower flanges 34 to the base flanges 38. Mounting means 20 also includes a horizontal stablizing bar 42 for each of the brackets 24 and 26. The bar 42 is fixed to the bracket and extends inwardly therefrom in the same direction as the flanges 34 and 32. Each stabilizing bar 42 has a vertical bore 44, see particularly FIG. 5. The mounting means 20 also includes a pair of vertical support rods 46 at each end or the trailer. The bottom ends of the support rods 46 are fixed to the bed 12 of the trailer and extend upwardly through the bores 44 of the stabilizing bars 42 when the lower flanges 34 are bolted to the base flanges 38.

Additional tube packages can be added to the trailer by positioning the first additional tube package so that the bottom flange 34 rests on top of the upper flange 32 of the first tube package so that the apertures 35 and 33 of the flanges 34 and 32, respectively are vertically aligned. The flanges 34 and 32 are secured by bolts 41 which constitute coupling means for the tube packages. Additional tube packages are added in the same manner. After each additional tube package is added to the stack and coupled to the previous stack, the projections 21 of the tubes are connected to fixtures 16.

The operation and advantages of the present invention will now be readily understood in view of the above description. Referring particularly to FIGS. 1 and 2, the tubes 22 within each modular tube package 18 are slightly spaced However, the space between tubes of adjacent tube packages and between the tubes of the lower most tube package and the bed 12 is substantially greater than the tube spacing within the package. This allows for certain types of testing, as for example, ultrasonic and acoustic emissions testing to be conducted while the tubes are still mounted on the trailer. This spacing also allows for visual inspection of the tubes, removal of paint and repainting. Since the tubes do not touch each other, there is less chance of corrosion on the other surfaces of the tubes The tube packages can be mounted on the trailer bed by a forklift or other similar equipment and removed in the same way. The tube packages can be removed as individual units for the types of testing which cannot be conducted while the tubes are on the trailer. Also, an entire tube package can be replaced easily if it becomes necessary to do so. For example, if it is determined that one or more tubes in a tube package is defective or does not meet certain government specifications, the tube package which contains the defective tube or tubes and the tube packages above this package are removed as individual units. The tube packages other than the one containing defective tubes are then returned to the tube trailer along with an additional tube package for replacing the tube package which contains one or more defective tubes. The ability to handle an entire group of tubes as a single unit facilitates substantially the process of removing and replacing tubes on the trailer. The means for mounting the tube packages to the trailer and coupling the packages to each other are extremely simple in design and operation so that the entire process of moving tubes on and off the trailer is greatly simplified over the prior art tube trailers

MODIFIED TUBE TRAILER

Figure 6:
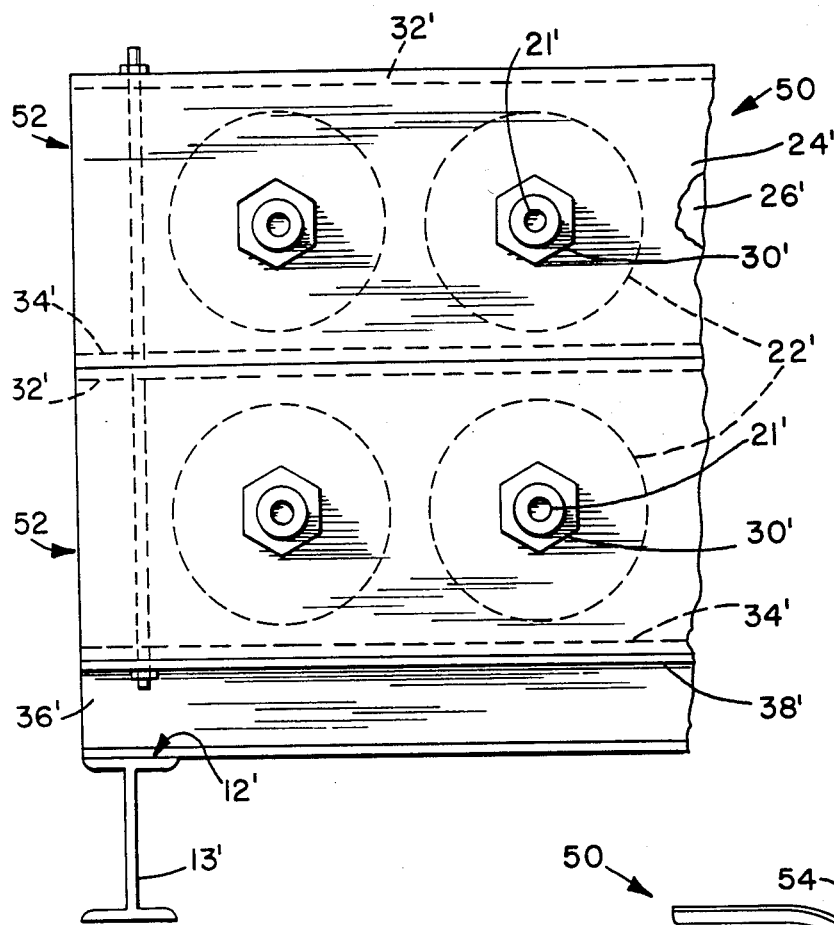
FIG. 6 is a fragmentary front elevational view of a modification.
Figure 7:
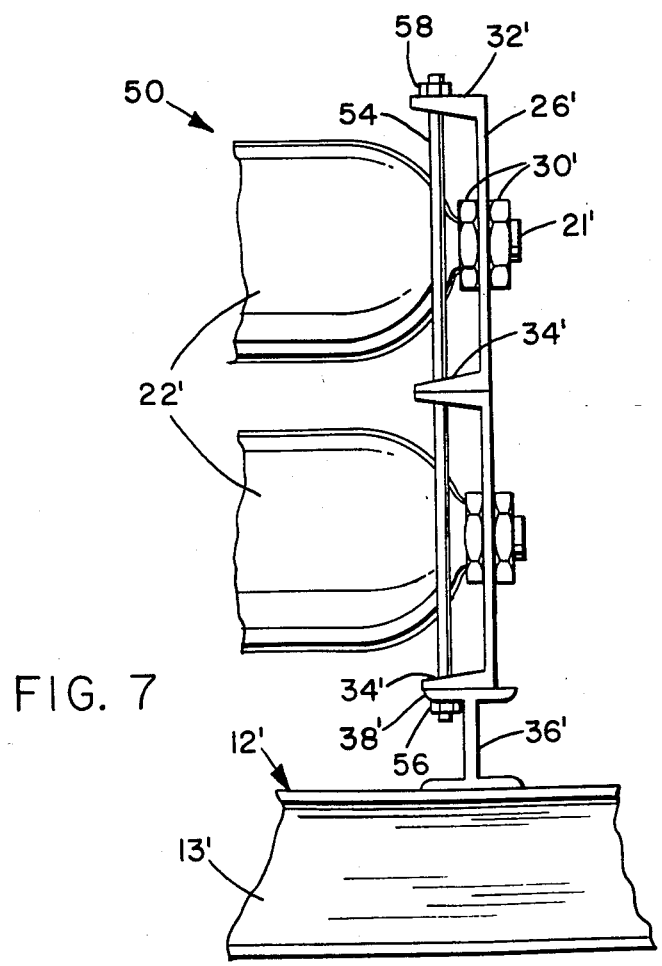
FIG. 7 is a fragmentary side elevational view of the modification of FIG. 6.

Referring to FIGS. 6 and 7, there is illustrated a modified tube trailer generally indicated by the reference numeral 50. The tube trailer 50 is identical to the tube trailer 10 with respect to the bed of the trailer, indicated generally by the reference numeral 12', which is formed by the upper horizontal flanges of I-beams 13'. The tube trailer 50 includes modular tube packages, generally indicated by the reference numeral 52. Each tube package 52 is similar to the tube packages 18 in that it includes a pair of brackets with a plurality of circular openings such as the openings 25 of the brackets 24 and 26. One of the brackets, indicated by the reference numeral 26', is shown in FIGS. 6 and 7 and includes an upper horizontal flange 32' and a lower horizontal flange 34'. The lower flange 34' is provided with a pair of apertures, not shown, which are vertically aligned with a similar pair of apertures, not shown, in the upper flange 32'. Mounting means for the tube package includes a horizontal base flange 38' of an I-beam 36' which is fixed to the bed 12' of the trailer. The base flange 38' is provided with a pair of apertures, not shown, which are vertically aligned with the apertures of the lower flange 34' when the flange 34' is placed on top of the base flange 38' as shown in FIG. 7. A pair of threaded rods 54 at each end of the tube package extend through the apertures in the upper and lower flanges 32' and 34', respectively, and through the aperture in the base flange 38'. A nut 56 is threaded to the bottom end of each rod 54 beneath the base flange 38'. A nut 58 is threaded to the upper portion of each rod 54 above the upper flange 32' and tightened to clamp the tube package 50 to the base flange 38'. If an additional tube package 50 is added to the first tube package as shown in FIG. 7, the rods 54 extend through the apertures in the flanges 34' and 32' of the additional tube package and the nut 58 is positioned above the upper flange 32' of the additional modular tube package 50. The nut 58 is tightened so that both tube packages 50 are clamped together and to the base flange 38'. In this way, the threaded rod 54 and the nuts 56 and 58 function as coupling means for the tube packages as well as mounting means for mounting the packages to the trailer bed in conjunction with the base flange 38' of the I-beam 36'. Additional tube packages 50 are added to the stack of tube packages by removing the nut 58, placing the brackets of the additional tube package on top of the brackets of the preceeding tube package so that the rods 54 extend through the apertures in the horizontal flanges of the additional tube package and repositioning the nut 58 above the upper flange 32' of the additional tube package for securing the tube packages to the trailer bed and to each other.

It is obvious that minor changes may be made in the form and construction of the invention without departing from the material spirit thereof. It is, however, desired to confine the invention to the exact form herein shown and described, but it is desired to include all such as properly come within the scope claimed.

The invention having been thus described, what is claimed as new and desired to secure by Letters Patent is:

1. A tube trailer comprising:
   (a) a horizontal supporting bed,
   (b) a manifold housing which extends upwardly at one end of said bed, said housing having a plurality of valve fixtures,
   (c) a rigid modular tube package comprising:
      (1) a plurality of cylindrical compressed gas tubes, each end of each of said tubes having a cylindrical projection, at least one projection of each tube having external threads and constituting a fixture which is complimentary to said valve fixtures for being operatively connected to one of said valve fixtures,
      (2) a first bracket,
      (3) a second bracket, and
      (4) connecting means for fixing said first bracket to one end of each of said tubes and said second bracket to the opposite ends of said tubes so that said tubes are parallel and spaced within a single plane, said connecting means comprising a plurality of spaced circular openings which extend in a single line in each of said first and second brackets, each of said opening having a diameter which is greater than the diameter of each of said projections so that said projections extend freely through said openings, the center of each of said openings being spaced from the centers of adjacent openings a distance which is greater than the diameter of each of said cylindrical tubes, and a nut for each projection which is threaded onto the projection for clamping the projections to said first and second brackets and thereby fixing said tubes to said first and second brackets,
   (d) mounting means for fixing said modular tube package to said bed so that one end of each tube is adjacent said manifold housing to enable the projection of each of said tubes which is complimentary to said valve fixtures to be operatively connected to one of said valve fixtures, and
   (e) coupling means for fixing a second tube package on top of said first tube package for vertical stacking of a plurality of said tube packages, said coupling means comprising:
      (1) a lower horizontal flange at the bottom of each of said first and second brackets,
      (2) an upper horizontal flange at the top of each of said first and second brackets which is vertically aligned with said lower flanges so that when a second tube package is placed on a first tube package the lower flanges of the second tube package rest on the upper flanges of the first tube package, and
      (3) fastening means for clamping said second tube package to said first tube package.

2. A tube trailer as recited in claim 1, wherein said fastening means comprises:
   (a) at least one aperture in each of said upper and lower horizontal flanges, the aperture in said upper and lower horizontal flanges being vertically aligned,
   (b) at least one threaded rod at each end of the stacked tube packages which is anchored to the bed and which extends upwardly and freely through all of the vertically aligned apertures in said flanges, and
   (c) a nut which is threaded onto said rod above the uppermost horizontal flange of said stacked tube packages.

3. A tube trailer as recited in claim 2, wherein said mounting means comprises:
   (a) a horizontal base flange at each end of the bed which is fixed to the bed for supporting the lower flanges of the lowermost tube package, each of said base flanges having an aperture which is vertically aligned with the apertures in the horizontal flanges of said first and second brackets for receiving the bottom end of said threaded rod, and
   (b) a nut which is threaded onto the bottom of each end of said threaded rods beneath said base flange, said nut thereby also functioning as the means for anchoring said rod to the bed.

4. A tube trailer as recited in claim 1, wherein said fastening means, comprise:
   (a) at least one aperture in each of said upper and lower horizontal flanges, the apertures in said upper and lower horizontal flanges being vertically aligned, and
   (b) a bolt which extends through the aperture of abutting upper and lower flanges of a pair of vertically stacked tube packages for fastening said abutting flanges together.

5. A tube trailer comprising:
   (a) a horizontal supporting bed,
   (b) a manifold housing which extends upwardly at one end of said bed, said housing having a plurality of valve fixtures,
   (c) a rigid modular tube package comprising:
      (1) a plurality of cylindrical compressed gas tubes, each end of each of said tubes having a projection, at least one projection of each tube constituting a fixture which is complimentary to said valve fixtures for being operatively connected to one of said valve fixtures,
      (2) a first bracket,
      (3) a second bracket, and
      (4) connecting means for fixing said first bracket to one end of each of said tubes and said second bracket to the opposite ends of said tubes so that said tubes are parallel and spaced within a single plane, and
   (d) mounting means for fixing said modular tube package to said bed so that one end of each tube is adjacent said manifold housing to enable the projection of each of said tubes which is complimentary to said valve fixtures to be operatively connected to one of said valve fixtures, said mounting means comprising:
      (1) a horizontal base flange at each end of the bed which is fixed to the bed,
      (2) a lower horizontal flange at the bottom of each of said first and second brackets for resting on said base flanges, and (3) means for fastening said base flanges to said lower horizontal flanges.

6. A tube trailer as recited in claim 5, wherein said mounting means comprises:
 (a) at least one stabilizing bar for each of said first and second brackets, one end of said stabilizing bar being fixed to the bracket and the opposite end of the stabilizing bar having a vertical bore, and
 (b) at least one vertical support rod at each end of the bed, the bottom end of each of said support rods being fixed to said trailer bed so that said rod extends upwardly through the bore of the adjacent stabilizing bar.

7. A tube trailer comprising:
 (a) a horizontal supporting bed,
 (b) a manifold housing which extends upwardly at one end of said bed, said housing having a plurality of valve fixtures,
 (c) a rigid modular tube package comprising:
  (1) a plurality of cylindrical compressed gas tubes, each end of each of said tubes having a projection, at least one projection of each tube constituting a fixture which is complimentary to said valve fixtures for being operatively connected to one of said valve fixtures,
  (2) a first bracket,
  (3) a second bracket, and
  (4) connecting means for fixing said first bracket to one end of each of said tubes and said second bracket to the opposite ends of said tubes so that said tubes are parallel and spaced within a single plane, and
 (d) mounting means for fixing said modular tube package to said bed so that one end of each tube is adjacent said manifold housing to enable the projection of each of said tubes which is complimentary to said valve fixtures to be operatively connected to one of said valve fixtures, said mounting means comprising:
  (1) a horizontal base flange at each end of the bed which is fixed to the bed, each of said base flanges having a vertical aperture,
  (2) a lower horizontal flange at the bottom of each of said first and second brackets for resting on said base flange, each of said lower horizontal flanges having a vertical aperture which is vertically aligned with the aperture of the base flange on which the lower horizontal flanges rest,
  (3) an upper horizontal flange at the top of each of said first and second brackets which is vertically aligned with said lower flange, each of said upper flanges having a vertical aperture which is vertically aligned with the apertures in the corresponding lower flange and base flange,
  (4) at least one threaded rod at each end of said tube package which extends upwardly through the vertically aligned apertures in said base flange, said lower flange and said upper flange,
  (5) a first nut which is threaded to the upper end of each of said rods above the upper flanges, and
  (6) a second nut which is threaded to the lower end of each of said rods below the lower flange.

8. A tube trailer as recited in claim 7, wherein each of said threaded rods is sufficiently long to extend through the apertures in the upper and lower flanges of one or more additional tube packages which are stacked on top of the first tube package so that the lower flanges of a an upper tube package rests on top of the upper flanges of a lower tube package and the apertures in the flanges of the upper tube package are aligned with the apertures in the flanges of the lower tube package, and wherein said first nut is threaded to the upper end of the rod above the upper flange of the uppermost tube package, whereby the rod and the first and second nuts are effective to function as coupling means for a plurality of tube packages.

9. A rigid modular tube package for a tube trailer having a supporting bed and a manifold housing which extends upwardly at one end of the bed and which has a plurality of pipe fixtures, said tube package comprising:
 (a) a plurality of cylindrical compressed gas tubes, each end of each of said tubes having a projection, at least one projection of each tube constituting a complimentary fixture to said pipe fixtures for being operatively connected to one of said pipe fixtures,
 (b) a first bracket,
 (c) a second bracket,
 (d) connecting means for fixing said first bracket to one end of each of said tubes and said second bracket to the opposite ends of said tubes so that said tubes are parallel and spaced within a single plane,
 (e) mounting means for fixing said modular tube package to said bed so that one end of each tube is adjacent said manifold housing to enable the complimentary projection of each of said tubes to be operatively connected to one of said pipe fixtures, and
 (f) coupling means for fixing a second tube package on top of said first tube package for vertical stacking of a plurality of said tube packages, said coupling means comprising: of
  (1) a lower horizontal flange at the bottom of each said first and second brackets,
  (2) an upper horizontal flange at the top of each of said first and second brackets which is vertically aligned with said lower flange so that when a second tube package is placed on a first tube package the lower flanges of said second tube package rest on the upper flanges of the first tube package, and
  (3) fastening means for clamping said second tube package to said first tube package.

* * * * *